United States Patent Office 3,435,008
Patented Mar. 25, 1969

3,435,008
METHOD FOR PREPARATION OF ISOMERICALLY PURE β-GLYCOLIDE AND POLYMERIZATION METHOD FOR GLYCOLIDE COMPOSITIONS EMPLOYING PARTIAL HYDROLYZATE OF SAID β-GLYCOLIDE
Edward Emil Schmitt, Norwalk, and Martin Epstein, Stamford, Conn., and Rocco Albert Polistina, Port Chester, N.Y., assignors to American Cyanamid Company, Stamford, Conn., a corporation of Maine
No Drawing. Continuation-in-part of abandoned application Ser. No. 484,111, Aug. 31, 1965. This application Aug. 22, 1967, Ser. No. 662,309
Int. Cl. C08g 17/00; C07d 13/06
U.S. Cl. 260—78.3         10 Claims

ABSTRACT OF THE DISCLOSURE

Recrystallization below the transition temperature of 42° C. is the basis of a process for preparing pure β-glycolide isomer from the isomer mixture. The β-glycolide partially hydrolyzes in moist air to a material (probably hydroxyacetyloxyacetic acid) which initiates polymerization at 50–245° C. of mixed glycolide compositions to polyesters free of extraneous catalysts.

CROSS REFERENCES TO RELATED APPLICATIONS

The present application is a continuation-in-part of our application Ser. No. 484,111, filed Aug. 31, 1965, now abandoned.

BACKGROUND OF THE INVENTION

The present invention is in the field of glycolides which are obtainable by the cyclic condensation of glycolic acid.

The closest known prior art is that contained in U.S. Patent No. 2,668,162, which relates to a process for producing polyhydroxyacetic esters and discloses the method for preparing a glycolide composition. The need for the use of an antimony compound as catalyst for effecting polymerization as well as the necessity for dry monomer and freedom from acid impurities therein is taught in the aforementioned identified patent. The need for catalyst results in a polymer containing said antimony catalyst as contaminant, which for certain uses, such as in medicine and surgery, is undesirable, if not prohibitive.

As pointed out in U.S. Patent No. 2,585,427, hydroxyacetic acid, also known as glycolic acid, is capable of various condensation reactions, involving elimination of water, to form a variety of products. Two molecules may condense with the elimination of two molecules of water to produce glycolide, a six-membered ring of the formula $C_4H_4O_4$ and structure

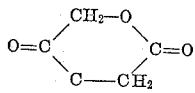

In other condensation reactions under the influence of heat, vacuum and catalyst, polyhydroxyacetic ester condensates of hydroxyacetic acid of general formula

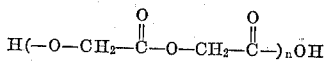

wherein $n$ represents a large integer characterizing a polymer, are produced. In these latter reactions, a large proportion of glycolide is produced as by-product of the reaction. The glycolides formed by condensation may be chemically purified and recovered by crystallization from ethyl acetate. In any case, the product obtained may be characterized as being chemically pure but not isomerically pure, the latter discovery being a part of the present invention.

By "chemically pure" is meant the virtual exclusion of substances other than glycolides of formula $C_4H_4O_4$. By "isomerically pure" is meant the presence of one specific isomeric form to the virtual exclusion of others.

A process for the polymerization of chemically pure, dry glycolide composition is disclosed in U.S. Patent No. 2,668,162 and involves heating said glycolide composition in a closed reaction vessel in an atmosphere of nitrogen and in the presence of catalytic amounts of antimony trioxide or antimony trihalide. Under such conditions, polymers having melt viscosities up to 50,000 poises at 245° C. are obtainable. However, when the glycolide is not dry and/or pure, polymers having melt viscosities considerably less than 400 poises at 245° C. are generally obtained. For extrusion of the polymers formed into fibers and films and for other uses, the melt viscosities must be at least 400 and not greater than 27,000 poises at 245° C. For other uses, as will be disclosed later, melt viscosities of 100 to 400 poises at 245° are desirable.

Thus, while the use of a catalyst is not required in forming polyhydroxyacetic esters from condensation of hydroxyacetic acid, the large proportions of glycolide produced as by-product gives rise to the need for processes for producing polyhydroxyacetic esters directly from a glycolide composition. In carrying out the process of the cited Lowe patent in polymerizing a glycolide composition, not only is it indicated to be necessary to catalyze the polymerization with an antimony compound, but it also appears necessary to employ a glycolide composition which is free of water and acid impurities, if desirable polymers are to be obtained. Thus, if a process could be obtained which would produce useful polymers from a glycolide composition and the polymers as obtained were free from any traces of contaminating polymerization catalyst, a long-felt need would be fulfilled.

SUMMARY OF THE INVENTION

This invention relates to the isomerization of glycolide and to a method for preparing the β-isomer of glycolide which is substantially chemically pure and substantially isometrically pure. More particularly, it relates to β-glycolide capable of forming a partial hydrolyzate when exposed to atmospheric moisture, said hydrolyzate when heated with a glycolide composition yielding a useful polymer free from any traces of contaminating catalyst. It also relates to the process of polymerization by which the useful polymer free from any traces of contaminating catalyst is produced.

It is an object of the present invention to provide a process for the preparation of substantially chemically pure and substantially isomerically pure β-glycolide, which when exposed in solid form to atmospheric moisture forms a partial hydrolyzate which can be heated with a glycolide composition to form a useful polymer free from any traces of contaminating polymerization catalyst. It is a further object of the present invention to provide the polymerization process whereby the useful polymers are obtained. These and other objects of the invention will become apparent from a consideration of the ensuing description.

It has now been discovered that the glycolide prepared in accordance with the method described in the aforementioned patents does not, in fact, constitute a single substance, but rather comprises a composition containing at least two distinct isolatable isomers designated by the α- and β-notations. Unexpectedly, it has also been discovered that the latter mixtures can be readily converted into one isomeric form, namely the β-isomer, which when partially hydrolyzed by atmospheric moisture is capable of effecting polymerization of glycolide compositions to obtain useful polymers. It has also been found, quite unexpectedly, that the substantially chemically pure and substantially isomerically pure β-isomer can be obtained from the substantially chemically pure and substantially isomerically pure α-isomer as well. In our companion application, Ser. No. 645,502, filed June 12, 1967, the α-isomer is disclosed as well as methods of obtaining it from isomeric mixtures of glycolides or from the substantially pure β-isomer. It is, of course, possible to prepare isomeric mixtures of glycolides as in the past by failing to observe certain restrictions in the processes given here and in the companion application, but such development does not advance the technology with respect to the glycolides.

In connection with the foregoing discoveries with respect to the isomerization of glycolide and the intervertability of the isomers, one to the other, it has also been discovered that the β-glycolide isomer is partially hydrolyzed in solid state by exposure to atmospheric moisture and that the partial hydrolyzate thus formed when employed with a glycolide composition can be polymerized by heating to form a useful polymeric material. This result is highly surprising and quite unexpected in view of the teachings of the art for several reasons. The hydrolyzate which forms, identifiable as hydroxyacetoxyacetic acid, is an acid yet is effective in the polymerization in spite of Lowe's teaching that acid impurities retard polymerization. In fact, in the absence of the hydrolyzate, it is believed that the glycolide cannot be usefully polymerized in the absence of special added catalysts. The hydrolyzate which forms is the result of the addition of one molecule of water to one molecule of β-glycolide and thus increases the water content of the composition, which is effective in the polymerization in spite of Lowe's teaching of the retardation of polymerization by the presence of water. Further, Lowe teaches that an antimony compound is necessary as catalyst to polymerize glycolide while in the present invention no such catalyst is necessary.

The β-glycolide of the present invention may be characterized as being capable of inducing polymerization of glycolide compositions when partially hydrolyzed by exposure in solid form to atmospheric moisture. It may be further characterized in having infrared spectral bands as follows: doublet carbonyl bands at 1795 and 1765 cm.$^{-1}$, additional distinctive bands at 1455, 1210, and 1080 cm.$^{-1}$, and the absence of any band at 1402 cm.$^{-1}$, since the latter is particularly characteristic of the α-isomer. To characterize the β-isomer further, the following properties are offered:

Crystal habit: Massive particles, monoclinic system.
Refractive indices: (relative to Na D-line at 25° C.):
$N_\alpha = 1.430$
$N_\beta = 1.552$
$N_\gamma = 1.568$
Optic axial angle:
$2V = -37°, 20'$.

According to the present invention, it has been discovered that when a glycolide composition containing at least some α-glycolide is dissolved in a substantially anhydrous inert organic solvent of suitable solvating capacity, selective crystallization can be effected to afford substantially chemically pure and substantially isomerically pure β-glycolide. By "glycolide composition" is meant a glycolide source which contains at least some α-glycolide or is substantially pure α-glycolide. A preferred procedure involves dissolving the glycolide composition in cyclohexane such that the solvent is saturated with respect to glycolides at a temperature below about 42°, filtering the solution to remove impurities and undissolved glycolides, cooling the solution below the saturation temperature, and isolating the crystals formed.

The product obtained is substantially chemically pure and substantially isomerically pure β-glycolide in yields of 35 to 95% based on the amount of glycolide in the composition. The β-glycolide so prepared is distinguished by its ability to be partially hydrolyzed by exposure to atmospheric moisture to yield a hydrolyzate which when heated with a glycolide composition will form a useful polymer free from any traces of contaminating catalyst. To maintain the β-glycolide in pure form it must be stored in the absence of moisture. In addition, it is necessary that β-glycolide be stored at a temperature below about 42° C., for reasons to be disclosed later, if it is to be maintained as pure β-glycolide.

The solvent useful in the process of the present invention is one which is of organic variety, has the ability to dissolve the glycolide composition as the glycolides therein, is essentially anhydrous, and is essentially inert with respect to glycolides. The solvent also must permit selective crystallization of β-glycolide in substantially chemically pure and substantially isomerically pure form. Numerous solvents are useful for this purpose, although some vary as to effectiveness or mode of operation. The ideal solvent is one which dissolves the glycolide composition in copious quantities below the melting point of the glycolides, becomes saturated with respect to glycolide at a temperature below about 42° C., and has considerably less solvating power for glycolide at somewhat lower temperatures so that essentially all of the glycolide present is precipitated as crystals of β-glycolide at temperatures somewhat below about 42° C. The important aspect of the solvent in the process is the manner in which it is employed rather than its particular generic identity. The preferred method of utility of the solvent in the process is such that it is saturated with respect to glycolide at a temperature which is sufficiently below about 42° C. to eliminate possibilities of precipitation of α-glycolide due to unintended warming of the precipitating solution due to heat of crystallization, etc. so that by cooling the saturated solution to a temperature somewhat below this temperature the major portion of the glycolide crystallizes from the solution to form substantially chemically pure and substantially isomerically pure β-glycolide. Depending upon the solvating power of the solvent for glycolides at varying temperatures, the effective saturation temperature and crystallizing temperature are determined. In this connection, those solvents which show sharp increases in solvating power for glycolides with increases in temperature, particularly at temperatures up to about 42° C., are especially suitable since major amounts of the dissolved glycolides can be recovered upon suitable cooling of the saturated solution. For practical purposes, it is generally preferred to saturate the solvent with glycolide at a temperature about 5 to 10° below about 42° C. and effect crystallization at temperatures down to the range of 0 to −10° C. In those instances where deficient amounts of the glycolide has been recovered by crystallization in the temperature range indicated, it may be desirable to evaporate some of the solvent from the mother liquor so as to enable further crystallization to occur in the indicated range of temperature to increase the yield of β-glycolide obtained.

Among the solvents that may be used in the practice of the present invention are such diverse solvents as benzene, cyclohexanone, chloroform, tetrahydrofuran, and others. While the above named solvents are generally preferred by virtue of their solubility-temperature curves, other solvents may also be employed. Illustrative solvents in addition to those previously named include, for example n-propanol, n-butanol, isobutanol, isoamyl alcohol, n-pentanol, hexanol, ethylene glycol, propylene glycol, diethylene glycol, triethylene glycol, cyclopentanol, cyclohexanol, benzyl alcohol, cresol, toluene, and the like. All of the solvents may be used either singly or in combination with one another.

Another critical aspect of solvent usage is the ratio of solute to solvent. It is essential that the solvent usage be sufficient to insure the precipitation of glycolide occurs below about 42° C. and not at higher temperatures. In this respect solvent usage differs from that in our companion case previously cited. In general, from about two to one hundred parts (by volume) of the selective solvent per parts by weight of glycolide composition are employed to effect satisfactory crystallization of the substantially chemically pure and substantially isomerically pure β-glycolide. Where the solvent is useful in the companion case previously cited as well as in the present invention, the solvent usage will be somewhat higher in the present process than in that of the cited companion application. Although solution may be effected solely at temperatures below about 42° C., it is also possible to heat the solvent in excess of this temperature to hasten solution, so long as the resulting solution does not result in precipitation of the crystals above about 42° C.

The transition temperature of glycolide is about 42° C. and is such that above this temperature the α-isomer is the thermodynamically stable form, while below it the β-isomer is the thermodynamically stable form. Generally, the isomer formed upon crystallization will be the form thermodynamically stable at the temperature of formation of crystals. However, due to certain anomalous behavior associated with certain solvents or the presence of undetected seeds of the thermodynamically unstable isomer previously formed at appropriate temperature, it is also possible in certain instances that a specific isomeric form of glycolide will appear to be obtained at temperatures which violate the transition temperature. In those instances where both isomeric forms of glycolide will crystallize from solution, it is necessary to maintain the crystallizing solution below the transition temperature to obtain the substantially chemically pure and substantially isomerically pure β-glycolide. It is also necessary to isolate the formed crystals in a manner which will avoid subsequent contamination with undesired isomer and/or other materials.

The melting point of glycolide is between about 82 and 85° C., depending upon the chemical purity thereof and the accuracy of the determination. Liquid glycolide is presumed to be a mixture of isomeric forms. Thus, if the glycolide is precipitated out of the solvent above its melting point, it will exist as an oily liquid without distinguishable form. The liquid which forms is capable of extensive supercooling without formation of a solid. The presence of the oily liquid can interfere with chemical purification. The avoidance of melting of the glycolide, therefore, is greatly to be preferred where chemical purity of the glycolide is essential.

In order to produce the partial hydrolyzate of the present invention, it is necessary to expose the substantially chemically pure and substantially isomerically pure β-glycolide to a moisture environment for a sufficient time period at a temperature below about 42° C. The product which forms is believed to be a linear dimer of hydroxyacetic acid of the formula:

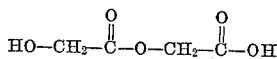

This product forms as a result of the addition of one molecule of water with one molecule of β-glycolide. This reaction of water with β-glycolide occurs in solid state and in such state is peculiar to β-glycolide. The α-isomer is relatively moisture-insensitive and does not produce the linear dimer under similar conditions of storage.

The extent of exposure of β-glycolide to moisture to effect the desired partial hydrolysis will depend upon the relative humidity and temperature of the environment. High humidities and the higher temperatures that are below about 42° C. generally produce the desired hydrolyzate in shorter times than lower temperatures and humidities. To expedite production of linear dimer, it may be desirable to draw moist air over the β-glycolide. In such case, for example, where the air temperature is 25° C. and the humidity content of the air is 50%, it is possible to produce about 50% of linear dimer in the β-glycolide exposed in about 8 days. While lesser or somewhat higher yields of linear dimer can be produced by varying the exposure conditions and/or time, it is generally not practical nor essential to produce 100% linear dimer in this manner. For the purpose of polymerizing a glycolide composition according to the process of the present invention, the yield of dimer is adequate.

The linear dimer content of the exposed β-glycolide can readily be determined by infrared spectral analysis. The dimer has a distinctive peak at 1105 cm.$^{-1}$, which is not present in other glycolide forms. By mixing varying portions of pure linear dimer with other glycolides and obtaining the resulting peak heights at 1105 cm.$^{-1}$, it is possible to obtain a measure of the concentration of linear dimer that is associated with such height. Then by comparing the height of any peak found at 1105 cm.$^{-1}$ of an exposed sample of β-glycolide with the reference standard, the concentration of linear dimer therein can be determined.

In carrying out the polymerization according to the process of the present invention, it is merely necessary to heat a glycolide composition having a suitable content of linear dimer at a temperature between about 50° C. and 245° C. for a sufficient time period. The content of linear dimer present in the glycolide composition may vary from about 5% to 20% by weight of the total composition, with about 10% on the same basis being preferred. In using the partial hydrolyzate in forming the polymerizable composition due allowance is made for the linear dimer content therein. Where β-glycolide is the glycolide composition to be polymerized, it is convenient to expose the substantially chemically pure and substantially isomerically pure β-glycolide to moisture under such conditions that the desired content of linear dimer is produced therein and subsequently heating the composition to effect polymerization. However, if more than the desired content of linear dimer is obtained, the content can be adjusted by adding a suitable quantity of unexposed β-glycolide thereto. In other cases where the linear dimer content is appropriate, it is possible to add other glycolide compositions thereto to effect the desired polymerization. Thus, isomeric mixtures of α- and β-glycolide or substantially chemically pure and substantially isomerically pure α-glycolide, or both may be added to the partially hydrolyzed β-glycolide composition to obtain the proper level of linear dimer and the resulting composition then heated to effect polymerization. The polymer obtained will be essentially the same in any case regardless of the glycolide composition as long as the content of linear dimer therein is appropriate to effect polymerization. If the linear dimer content in the glycolide composition is below about 5%, a reasonable quantity of a polymer of suitable molecular weight is not obtained until unduly long time periods of heating are employed, if then. If the linear dimer content is too high, a polymer of suitable molecular weight cannot be obtained. Therefore, the important aspect with respect to linear dimer content in the glycolide composition to be polymerized is that it be sufficient to promote a desirable degree of polymerization yet not too great as to interfere with the attainment of polymer of suitable molecular weight.

In heating the polymerizable composition to accelerate polymerization, as previously indicated, temperatures in the range of 50° C. to 245° C. are generally useful, with the range of 60° C. to 180° C. being preferred. The time of heating will vary with the temperature employed, with higher temperatures generally requiring shorter time periods. For example, using a temperature of 80° C., a suitable polymer is produced in 16 hours or less. At the end of the heating period if all of the glycolide composition has not been converted to polymer, that which is unpolymerized may be recovered by sublimation and condensation of the sublimate. The sublimation may be effected, for example, by heating the glycolide composition to a temperature in the range of 75° C. to 130° C. at a pressure not over 2.5 mm. of mercury, absolute. The yield of polymer will vary depending upon the various conditions, but yields of 40% and higher are readily obtained.

The β-glycolide produced by the process of the present invention has special utility when advantage is taken of its ability to form linear dimer, or hydroxy-acetoxyacetic acid, upon exposure to moisture in solid state and subsequent utility is made of this intermediate in effecting polymerization of a glycolide composition by the polymerization process of the present invention. The polymer thus produced is free of any traces of contaminating catalyst and is useful, particularly in medicine or in surgery, where the presence of the conventional catalysts based on antimony compounds is undesirable. The resulting polymer is of sufficient molecular weight, for example, to be used as a coating for a medicine to be swallowed in solid form and which, in the absence of said coating, would normally be adversely affected by the acidic environment of the stomach and thus lose its therapeutic value. The presence of the coating will enable the medicine to pass in active form to the lower digestive tract where the alkaline environment will effect removal of the coating and enable therapeutic value of the medicine to be obtained. Coatings of the type described are generally referred to as "enteric coatings."

For use as enteric coatings, the polymer obtained from the glycolide composition according to the process of the present invention desirably has melt viscosities in the range of 100–400 poises at 245° C. These values are especially suitable for the following reason:

(1) The lower molecular weight associated with the polymer enables hydrolysis to be readily effected when the medicine has entered the lower digestive tract yet is sufficiently high to protect the medicine in the stomach, (2) The polymer used as a coating does not have to possess sufficient strength to be self-supporting as in a film or fiber and, therefore, can be within the molecular weight range associated with the melt viscosities employed, and (3) The polymer is readily applied to medicine by virtue of its low melt viscosity yet its sticking temperature is sufficiently high so as not to cause undesirable cohesion of individual pills at normal temperatures of storage.

While in the foregoing description of the present invention the terms "isomerism," "isomeric," and "isomers" have been employed, it is possible that other terminology is appropriate. Thus the terms "polymorphism," "polymorphic," and "polymorphs" may be considered appropriate based on the showings made. However, additional information not pertinent to the invention described herein gives rise to strong support for the existence of conformational isomers. Conformational isomers may be defined as those having the same atomic composition and atomic bonds within the molecule, but differing with respect to the relative position of atoms and shape resulting from such arrangement. They can be likened to the differences in the "boat" and "chair" forms of cyclohexane. However, although energy differences between the two conformations of cyclohexane are not such as to give rise to separate isomers which can be isolated, in the present case, as in others, a suitable energy condition exists so as to enable isolation of the separate isomers. While the explanation given above for the choice of terminology is thought to be accurate, it is to be understood that the invention thus described is not limited by the accuracy of the terminology by which it is described.

In order that the concept of the present invention may be more fully understood, the following examples are set forth in which all parts are parts by weight unless otherwise indicated. These examples are set forth primarily for the purpose of illustration and any specific enumeration of detail contained therein should not be interpreted as a limitation on the case except as is indicated in the appended claims.

Example 1

This example illustrates the conventional preparation of a mixture of α- and β-glycolide isomers.

Into a suitable vessel are added 400 parts of commercial glycolic acid which is heated to 170–180° C. at atmospheric pressure to distill off water. The pressure is then slowly reduced to the equivalent of 5 mm. of Hg and the vessel maintained at the temperature indicated until water ceases to distill. The resultant mixture is then allowed to cool, recovered, and ground into powder. About 280 parts of the latter are slowly added to a flask purged with nitrogen and held at a pressure below the equivalent of 15 mm. of Hg and at a temperature from about 250–285°. 250 parts of the resultant distillate are next dissolved in approximately twice its weight of ethyl acetate at the boiling point; decolorizing charcoal is added; and reflux continued for ½ hour. The solution is filtered while hot; cooled; and white glycolide crystals are obtained on filtering and drying. The recrystallization is repeated twice in like manner except that the decolorizing charcoal is omitted. There is obtained 160 parts of an isomeric mixture of glycolides having a melting point of 83.8–84.3° C.

The product is characterized by distinctive infrared spectral bands at the following wavelengths: 1795, 1772, 1765, 1750, 1455, 1402, 1210, and 1080 cm.$^{-1}$. Elemental analyses and molecular weight determination are consistent with a chemically pure glycolide. No consistent values for refractive indices, crystal habit, or optic axial angle are obtained.

Example 2

This example illustrates a preferred controlled solvent saturation process for the isolation of substantially chemically pure and substantially isomerically pure β-glycolide in accordance with the present invention.

100 parts of a mixture of α- and β-glycolides as prepared in Example 1 above are placed in a suitable reactor and 450 parts (by volume) of cyclohexanone are added. The mixture is heated to about 80° C. to achieve solution. The solution is then slowly cooled with stirring to a temperature below 32° C. without the formation of precipitate. Continued cooling to 0° C. results in the formation of 35 parts of precipitate which is collected and dried. Cooling of the filtrate to —40° C. results in an additional 28 parts of precipitate. The combined precipitate is in the form of massive particles in the monoclinic crystal system. The product has the following distinctive infrared spectral bands: doublet carbonyl bands at 1795 and 1765 cm.$^{-1}$, additional distinctive bands at 1455, 1210, and 1080 cm.$^{-1}$, and the absence of a band at 1402 cm.$^{-1}$, since the latter is characteristic of the α-glycolide isomer. The crystals have the following refractive indices (relative to Na D-line at 25° C.):

$N_\alpha = 1.430$
$N_\beta = 1.552$
$N_\gamma = 1.568$

The crystals have an optic axial angle $2V = -37°20'$. A molecular weight determination in acetonitrile affords an actual value of 110 as compared with a theoretical value of 116. Upon an elemental carbon and hydrogen analysis, the following in percentages are recorded:

Calculated for $C_4H_4O_4$: C, 41.39; H, 3.47. Found: C, 41.24; H, 3.50.

Examples 3–5

These examples illustrate other useful solvents in the controlled solvent saturation process for isolation of substantially chemically pure and substantially isomerically pure β-glycolide in accordance with the present invention.

In the following examples the procedure of Example 2 is followed in every material detail except for the solvent usage. The following table indicates the controlled usage of other effective solvents in the present invention.

| Example No. | Solvent | Parts (by volume) | Yield (percent) |
|---|---|---|---|
| 3 | Tetrahydrofuran | 2,500 | 25 |
| 4 | Benzene | 6,000 | 50 |
| 5 | Chloroform | 4,500 | 45 |

The product obtained in every case is substantially chemically pure and substantially isomerically pure β-glycolide having the same distinctive characteristics described in Example 2.

Examples 6–9

These examples illustrate solvent usage in a manner which will not produce substantially chemically pure and substantially isomerically pure β-glycolide and are outside the scope of the present invention.

The procedure of Example 2 was followed except that for the solvent usage therein there was substituted that shown in the following table. In all cases precipitation of crystals began before the hot solutions could be cooled below 42° C. The product obtained in all cases was an isomeric mixture of α- and β-glycolides as characterized in Example 1.

| Example No. | Solvent | Parts (by volume) |
|---|---|---|
| 6 | Methanol | 500 |
| 7 | Ethyl acetate | 200 |
| 8 | Acetonitrile | 100 |
| 9 | Tetrahydrofuran | 350 |

Example 10

This example shows the preparation of substantially chemically pure and substantially isomerically pure α-glycolide according to the process of our copending application Ser. No. 484,110, filed Aug. 31, 1965, for use in subsequent examples.

Into a suitable vessel are placed 100 parts of glycolide as prepared in Example 1 above and 650 parts (by volume) of isopropyl alcohol. The mixture is heated to 60° C. with stirring to effect solution. The hot solution is filtered through activated charcoal. After cooling to about 42° C., white crystals precipitate out of solution. The crystals are filtered and washed with ether to yield after drying 64 parts of α-glycolide as distinguished by its infrared spectrum and other physical properties.

Example 11

100 parts of the substantially chemically pure and substantially isomerically pure β-glycolide prepared in accordance with the procedure of Example 2 are exposed to atmospheric moisture as encountered with a temperature of 38° C. and 50% relative humidity until about 10% of linear dimer can be detected by infrared spectral analysis. The resulting mixture is then heated at 80° C. for a period of 18 hours. 40% of the starting glycolide is converted into a polymer having a melt viscosity of 250 poises when measured at 245° C. The unpolymerized glycolide is recovered by sublimation at 80° C. at a pressure equivalent to 2.3 mm. of Hg absolute and condensation of the vapors thus produced.

The polymer thus produced is employed as an enteric coating employing the medicinal compositions disclosed in U.S. Patent No. 3,004,893. The polymer is formed into prills and several prills are then applied as a coating for the pills of the cited patent under the influence of heat and pressure, in accordance with well-known coating techniques. The coating is readily hydrolyzed in an alkaline environment similar to that of the lower digestive tract but is not removed when exposed to the acidic environment encountered in the stomach. The coating thus produced has a sticking point of about 175° C. so that no cohesion of the formed coated pills occurs at normal storage conditions.

Example 12

100 parts of the substantially chemically pure and substantially isomerically pure α-glycolide prepared in accordance with the procedure of Example 3 are subjected to the same atmospheric conditions indicated in Example 12. Even after time periods considerably longer than necessary with β-glycolide, the formation of detectable amounts of linear dimer is not evident. Attempts to polymerize the exposed α-glycolide in the manner described in Example 11 produced no polymer.

Example 13

100 parts of the conventional mixture of α- and β-glycolides prepared in accordance with the procedure of Example 1 are exposed to atmospheric moisture according to the conditions of Example 11. Even after considerably longer exposures than necessary with β-glycolide, the formation of linear dimer is not detectable by infrared spectral analysis. Attempts to polymerize the exposed mixture in the manner described in Example 11 produces less than 10% of polymer, the melt viscosity of which is less than 100 poises at 245° C. The polymer obtained is not useful as an enteric coating.

Example 14

100 parts of the substantially chemically pure and substantially isomerically pure β-glycolide prepared in accordance with the procedure of Example 2 are exposed to atmospheric moisture as encountered with a temperature of 38° C. and 50% relative humidity until about 50% of linear dimer can be detected by infrared spectral analysis. To the resulting mixture is then added 400 parts of the glycolide composition prepared in accordance with the procedure of Example 1. The resulting mixture is then heated at 80° C. for a period of 18 hours. 40% of the starting glycolide is converted into a polymer having a melt viscosity of 250 poises when measured at 245° C. The unpolymerized glycolide is recovered by sublimation at 80° C. at a pressure equivalent to 2.3 mm. absolute and condensation of the vapors thus produced.

The polymer thus produced exhibits the same performance as that of Example 11 when employed as an enteric coating in accordance with the procedure therein described.

We claim:

1. A process for preparing substantially chemically pure and substantially isomerically pure β-glycolide from a glycolide composition containing at least some α-glycolide which comprises dissolving sufficient glycolide composition in an inert substantially anhydrous organic solvent so as to provide a saturated solution below about 42° C., cooling the solution below the saturation temperature thereby effecting crystallization at the lower temperature, recovering the formed crystals of substantially chemically pure and substantially isomerically pure β-glycolide, and storing the recovered β-glycolide in a substantially anhydrous state at a temperature below about 42° C.

2. A process according to claim 1 wherein the solvent is cyclohexanone.

3. A process according to claim 1 wherein the solvent is tetrahydrofuran.

4. A process according to claim 1 wherein the glycolide composition is an isomeric mixture of α- and β-glycolides.

5. A process according to claim 1 wherein the glycolide composition is substantially chemically pure and substantially isomerically pure α-glycolide.

6. A process for preparing a polyhydroxyacetic ester having a melt viscosity in the range of about 100 to 400 poises when measured at 245° C. from a glycolide composition which comprises heating said glycolide composition and from about 5% to 20% by weight thereof of hydroxyacetoxyacetic acid at a temperature between about 50° C. and 245° C. until the desired viscosity is achieved.

7. The process of claim 6 wherein the glycolide composition to be polymerized is an isomeric mixture of α- and β-glycolides.

8. The process of claim 6 wherein the glycolide composition to be polymerized is substantially chemically pure and substantially isomerically pure α-glycolide.

9. The process of claim 6 wherein the glycolide composition to be polymerized is substantially chemically pure and substantially isomerically pure β-glycolide.

10. The process of claim 6 wherein the amount of hydroxyacetoxyacetic acid present is 10% by weight of the glycolide composition present.

References Cited

UNITED STATES PATENTS

| | | | |
|---|---|---|---|
| 2,585,427 | 2/1952 | Beck | 260—78.3 |
| 2,668,162 | 2/1954 | Lowe | 260—78.3 |
| 2,676,945 | 4/1954 | Higgins | 260—45.7 |
| 3,297,033 | 1/1967 | Schmitt | 128—335.5 |

WILLIAM H. SHORT, *Primary Examiner.*

E. A. NIELSEN, *Assistant Examiner.*

U.S. Cl. X.R.

260—340.2, 484; 424—32, 78